United States Patent Office 2,922,658
Patented Jan. 26, 1960

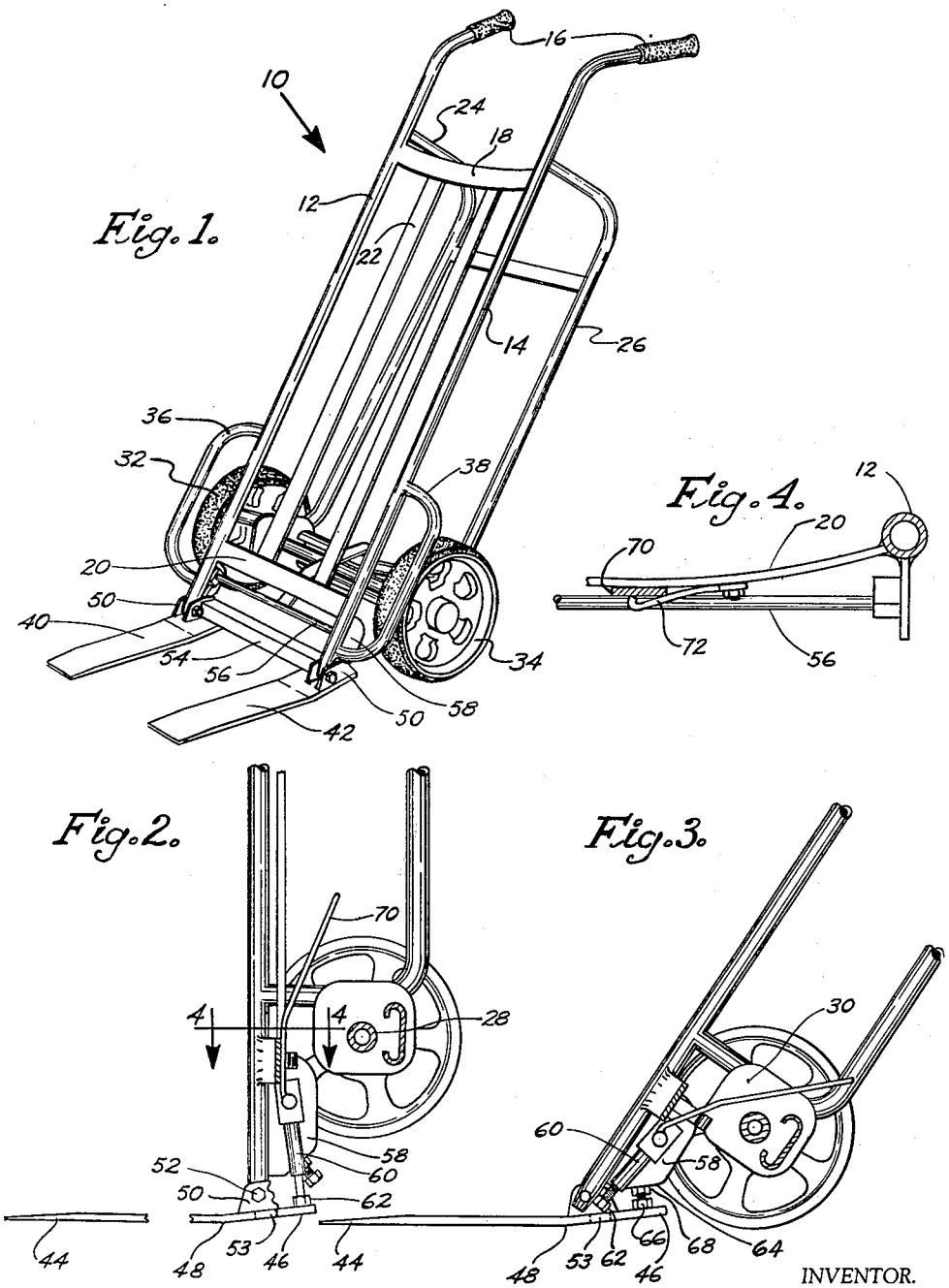

2,922,658

TWO WHEEL WAREHOUSE TRUCK HAVING PIVOTED LOAD SUPPORT

John Walter Manahan, Goodhue, Minn., assignor of one-half to Ore Oelkers, Mazeppa, Minn.

Application June 24, 1957, Serial No. 667,424

2 Claims. (Cl. 280—47.29)

This invention relates to improvements in a two wheel hand truck intended for transporting heavy merchandise in and about a warehouse. In general, the invention is concerned with a truck constructed to pick up and deposit heavy merchandise in a stacked condition. More particularly, the truck embodies a load supporting member pivotally joined to a frame and provided with adjustable connections between the frame and the load supporting member, which are releasable to withdraw the truck from a stacked load, and which are self-engaging to interlock the frame and the load supporting member when another load is picked up.

It is a general practice to warehouse many forms of heavy merchandise either in a palleted or stacked condition. To facilitate movement of the merchandise thus stored requires a truck constructed to enable the operator to handle very heavy loads, and also to be able to easily detach the load from the truck in a palleted or stacked condition. In my prior application, Ser. No. 483,534, filed January 24, 1955, now Patent No. 2,854,245 issued September 30, 1958, I have disclosed one form of warehouse truck constructed for this particular purpose. In the present application, I have provided a modified form of truck primarily intended for handling palleted loads or heavy stacked items. In the present invention, the load supporting member is formed with heel and toe portions, and the frame is pivotally joined to the load supporting member between the heel and toe portions and is provided with releasable locking braces carried by the frame that abut the heel portions of the load supporting member in picking up a load. When depositing the load, the locking braces may be released to permit withdrawal of the truck from beneath the load, and these locking braces are so arranged as to interlock with the load supporting member by a rocking movement of the frame when another load is picked up. Still further, these features are embodied in a truck wherein ground engaging pivots are provided on the load supporting member between the heel and toe portions to facilitate tilting the load onto the truck when the ground engaging wheels are in a position to support the load.

An object of the invention is to provide a warehouse truck for lifting and stacking heavy loads embodying a load supporting member pivotally joined between its front and rear ends to a normally upright frame, and providing releasable pivoted locking braces that co-act between the frame and the load supporting member by an abutting action so that the braces may be easily released and will perform a self-locking action when the next load is picked up.

Another object is to provide a truck embodying a load supporting member pivotally interlocked with a frame, and in which the interlocking means are adjustable to provide a nice balance between the parts, and compensate for minor irregularities in the parts.

A further object is to provide a warehouse truck embodying a pivoted releasable frame, a load supporting member formed with toe and heel portions, and a ground engaging pivot between these portions to aid in tilting the loaded truck onto the ground engaging wheels.

Other and further objects will become apparent from the following specification and claims, and in the appended drawing in which:

Fig. 1 is a perspective view of the warehouse truck forming the present invention;

Fig. 2 is a side view of a lower portion of the truck illustrating details of the connections between the frame and the load supporting member when a load is about to be picked up;

Fig. 3 is a side elevation of similar portions of the truck with the parts in another relationship with respect to each other; and Fig. 4 is a plan view taken on the lines 4—4 of Fig. 2.

Having reference to the several figures of the drawing, the invention will be described in detail. General reference numeral 10 indicates in its entirety a pallet-type warehouse truck embodying a normally upright frame composed of a pair of laterally spaced side rails 12 and 14 formed with handle portions 16 on their outer ends. Between the side rails extend transverse bracing members 18 and 20, that are connected by a number of vertical bracing members 22. Reference characters 24, 26 indicate a pair of U-shaped members secured by welding to the rear sides of the side rails 12 and 14, and these members 24, 26 serve to support the load when the side rails are tilted horizontal to the ground. A transverse axle 28 is secured by means of rectangular plates 30 to the lower portions of the supporting members 24 and 26. A pair of ground engaging wheels 32, 34 are secured to the outer ends of axle 28. The side rails 12 and 14 have rigidly mounted on their lower lateral surfaces guard rails 36, 38 that act to prevent the load from rubbing or engaging against the wheels 32, 34.

A load supporting member is composed of a pair of laterally spaced plates 40, 42, each formed with a beveled toe portion 44, a heel portion 46 and a downwardly sloping instep 48, the latter forming ground engaging pivots between the toe and heel portions, and used to aid in tilting a load from the ground onto the truck. In rear of the instep 48, each of the members 40, 42 on its upper surface carries a bifurcated bracket 50 that is pivotally joined to the lower ends of the side rails 12 and 14 by means of bolts or other suitable pivots 52. Immediately in rear of each of the brackets 50, each of the members 40, 42 is provided with an opening 53, seen in Figs. 2 and 3, whose function will be explained later. A transverse angle iron brace 54 extends between the inner sides of members 40, 42 for uniting the rear ends into a single structure.

Situated above the brace 54 and beneath the transverse brace 20 is a rod 56 whose outer ends are journaled in brackets 58 welded to the rear lower sides of the side rails 12 and 14. A pair of depending locking braces 60 are mounted on the opposite ends of rod 56 and are interiorly threaded to receive extendable bolts or machine screws 62. The bolts 62 are adjustable with respect to the braces 60 so that when the frame is in a vertical position as shown in Fig. 2, the head portions of the bolts will engage the heel portions 46 of the load supporting member, and when the frame is rearwardly tilted as disclosed in Fig. 3, the head portions may extend into the apertures 53.

Each of the brackets 58 is formed with a rear sloping surface 64, and each of said surfaces is formed with a threaded aperture, not shown, to receive a smaller threaded machine bolt 66 secured by a lock nut 68. The smaller stop members or bolts 66 are adjustable and are intended to abut the heel portions 46 when the frame is in a tilted position such as disclosed in Figs. 1 and 3.

Rod 56 is journaled for rotatable movement in the brackets 58, and a foot operated lever 70 is secured to rod 56 between its opposite ends to provide this movement. A leaf spring 72, best seen in Fig. 4 is secured at one end to the cross brace 20 and extends in the rear of the lever 70 for biasing the same in the direction of the main frame and for holding the depending members 60 in the position shown in Fig. 3 when the frame is in the unlocked condition. Spring 72 tends to urge the lever 70 to its inwardly swung position so that when the truck frame is rotated from the position of Fig. 3 to the position of Fig. 2, the head portions of the bolts 62 are brought into engagement with the heel ends of the load supporting members.

The operation of the truck will now be explained. With the parts in the position as shown in Figs. 1 and 3, the truck is prepared to pick up a load, and the load supporting members 40, 42, are projected under a pallet, or a load resting on the floor. This action will bring the forward portion of the interconnected load supporting members between the toe 44 and the instep 48 in contact with the ground. The frame is then rotated to the position of Fig. 2, causing the head portions of the bolts 62 to drag upon the top surfaces of the heel portions 46 under the influence of spring 72 until they reach an upright position to form an interlock between the frame and the load supporting members. Then, by exerting pressure on the handles 16, the load is momentarily pivoted on the insteps 48 to overcome inertia until the heel portions 46 engage the ground. Then, by further pressure, the load is tilted on the heel portions 46 until the ground engaging wheels 32, 34, contact the ground and thence by continued movement the load is transferred to the wheels and is transported to its place of deposit. In setting the load down, the action occurs in reverse with the load momentarily pivoted on the wheels and then transferred to the heel portions 46, and thence further transferred through the insteps 48 to full contact with the ground. Then, by depressing lever 70 with the foot, the locking braces 60 are rotated clockwise to the position shown in Fig. 3 where their head portions may project into the apertures 53 until the short bolts 66 engage the heel portions 46, whence the truck may be withdrawn from beneath the load. It will be observed that the parts remain in an unlocked condition until the frame is again rotated to the position of Fig. 2 beneath the next load, whence the locking mechanism rotates without manual actuation to the position shown in Fig. 2 to again interlock the frame with respect the load supporting members.

A principal advantage of the invention resides in the provision of a warehouse truck wherein the load supporting portion is pivoted to the frame for insertion under a load and may be locked to the frame when the latter is in an upright position to permit tilting the weight of the load from the floor to the ground engaging wheels of the truck, and in the readily releasable feature which may be self-relocked when the truck is ready to pick up another load.

Another advantage resides in providing adjustment of the critical parts of the locking mechanism to compensate for minor irregularities, and to assure an exact balance between the parts of the truck.

A further advantage resides in the provision of an abutting type of locking mechanism which will permit free swinging movement of the frame even slightly to the left of the disclosure of Fig. 2 to project the load supporting member under the load and which engages by abutment the frame and the load supporting member at the proper time when the load is to be transferred from the toe portions to the instep and heel portions of the load supporting member.

My invention is defined in the terms of the appended claims.

I claim:
1. A warehouse truck, comprising a load supporting member formed with ground engaging toe and heel portions and with a depending instep between the toe and heel portions forming a ground engaging pivot, a frame member composed of a pair of laterally spaced rails each pivotally joined at their lower ends to said load supporting member in rear of said instep, a pair of ground engaging wheels each journaled on one of said side rails upwardly from and in rear of said load supporting member, a depending member carried by the frame and projecting in the direction of the heel portion of the load supporting member, said depending member supported for rotatable movement on a horizontal axis, resilient means operatively connected to said depending member and biasing the same in a direction generally parallel with the frame, said depending member being of sufficient length to abut the heel portion when the frame is in a substantially vertical position and the load supporting member is engaging the ground in front of the instep to form a brace between the frame and the load supporting member to provide initial pivoting of the load supporting member on the instep and then on the heel portion before the wheels engage the ground when the frame is rotated in the direction of the wheels, and means for rotating the lower end of said depending member in the direction of the pivotal connection between the frame and the load supporting member to unlock the frame from the load supporting member when the latter is engaging the ground in front of the instep.

2. A warehouse truck, comprising a load supporting member formed with ground engaging toe and heel portions and a depending instep between said toe and heel portions forming a ground engaging pivot, a frame member composed of a pair of laterally spaced rails each pivotally joined at their lower ends to said load supporting member in rear of said instep, a pair of ground engaging wheels each journaled on one of said side rails upwardly from and in rear of said load supporting member, a rod journaled on said frame for rotatable movement on a horizontal axis, a pair of depending members carried by said rod in rear of the side rails and projecting in the direction of the heel portion of the load supporting member, resilient means operatively connected to said depending members and biasing the same in a direction generally parallel with the frame, said depending members being of sufficient length to abut the heel portion when the frame is in a substantially vertical position and the load supporting member is engaging the ground in front of the instep to form braces between the frame and the load supporting member to provide initial pivoting of the load supporting member on the instep and then on the heel portion before the wheels engage the ground when the frame is rotated in the direction of the wheels, and means for rotating the lower ends of said depending members in the direction of the side rails to unlock the frame from the load supporting member when said load supporting member is engaging the ground in front of the instep, and thereby permit swinging movement of the frame in the direction of the wheels.

References Cited in the file of this patent
UNITED STATES PATENTS

| | | |
|---|---|---|
| 1,185,383 | Dickson | May 30, 1916 |
| 1,436,173 | Hoxie | Nov. 21, 1922 |
| 1,484,864 | Bompart | Feb. 26, 1924 |
| 2,653,033 | Chenette et al. | Sept. 22, 1953 |
| 2,680,027 | De Puydl et al. | June 1, 1954 |

FOREIGN PATENTS

| | | |
|---|---|---|
| 102,233 | Great Britain | Nov. 23, 1916 |